(12) United States Patent
Nakano et al.

(10) Patent No.: US 6,193,816 B1
(45) Date of Patent: Feb. 27, 2001

(54) SPRING WITH CORROSION FATIGUE STRENGTH

(75) Inventors: Tomohiro Nakano, Ama-gun; Takayuki Sakakibara, Okazaki; Masami Wakita, Nagoya, all of (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/192,271

(22) Filed: Nov. 16, 1998

(30) Foreign Application Priority Data

Nov. 17, 1997 (JP) .................................................. 9-333633

(51) Int. Cl.[7] .................................................. C22C 38/46
(52) U.S. Cl. .......................... 148/333; 148/580; 148/909
(58) Field of Search .................................. 148/333, 909, 148/580

(56) References Cited

U.S. PATENT DOCUMENTS 5,009,843 * 4/1991 Sugimoto et al. .................... 148/908
5,258,082 * 11/1993 Koyama et al. .................... 148/908

FOREIGN PATENT DOCUMENTS 03002354   1/1991   (JP) .

* cited by examiner

Primary Examiner—Deborah Yee
(74) Attorney, Agent, or Firm—Oliff & Berridge, PLC

(57) ABSTRACT

A spring is provided having a high durability in actual use and sagging resistance of the same level as or higher than conventional ones through improvement of the corrosion fatigue resistance. The spring uses as a material a steel including C: 0.35–0.55%, Si: 1.60–3.00%, Mn: 0.20–1.50%, S: 0.010% or less, Ni: 0.40–3.00%, Cr: 0.10–1.50%, N: 0.010–0.025%, V: 0.05–0.50% and Fe balance. The steel is heat treated to have a hardness of 50.5–55.0 HCC and shot-peened at a moderate temperature to render a residual stress of −600 MPa or more at a depth of 0.2 mm below the surface. The temperature at which the spring is shot-peened is preferably 100–300° C., and the hardness of shot particles for the shot-peening is preferably 450–600 Hv.

20 Claims, 4 Drawing Sheets

SPRING WITH CORROSION FATIGUE STRENGTH

BACKGROUND OF THE INVENTION

1. Field of Invention

The present invention relates to springs with an improved corrosion-fatigue strength.

2. Description of Related Art

From the viewpoint of environmental protection and resource protection, it is strongly demanded to reduce the amount of toxic substances in exhaust gas and improve the fuel efficiency of automobiles. Since these are achieved by reducing the weight of an automobile to a considerable extent, efforts for reducing the weight of every automobile part are constantly underway. In the case of springs, including suspension springs, an increase in the employing stress (or the design stress) of a spring directly contributes to its weight reduction. But the increase in the employing stress usually causes fatigue and sagging of the spring. This problem is not limited to the springs used in automobiles, but also occurs to springs used in general machines.

Many kinds of spring material have been proposed so that that include various alloying elements to improve the fatigue resistance and sagging resistance. In the Publication of Unexamined Japanese Patent Application No. H3-2354, for example, a spring steel is disclosed including a lesser amount of Carbon, but including Nickel and Chromium and including a greater amount of Nitrogen than conventional ones. It is further proposed to include, in addition to those prescribed, one or more among the elements of Niobium, Vanadium and Molybdenum.

SUMMARY OF THE INVENTION

Sagging can be effectively reduced, in general, by increasing the hardness of the material. Under an ideal condition, increase in the hardness also improves the fatigue resistance to a certain extent. In the case of the automobile, though, the suspension springs are used in such places where they are constantly exposed to water and mud splashes. It is thus critical in actual use to consider the corrosion of the springs first, because corrosion forms minute pits on the surface of the springs and the pits initiate fatigue fracture of the springs.

The present invention is achieved to solve the problem. One of the objects of the present invention is to improve the fatigue corrosion resistance of the springs and provide springs having a high fatigue resistance in actual use, as well as having sagging resistance equal to or higher than conventional ones.

The spring of the present invention achieved to solve the above problem is characterized by:

a) using as a material a steel comprising C: 0.35–0.55%, Si: 1.60–3.00%, Mn: 0.20–1.50%, S: 0.010% or less, Ni: 0.40–3.00%, Cr: 0.10–1.50%, N: 0.010–0.025%, V: 0.05–0.50% and Fe balance;

b) heat treating to have a hardness of 50.5–55.0 HRC; and c) shot-peening at a moderate temperature to render a residual stress of −600 MPa or more at a depth of 0.2 mm below surface.

A more preferable effect can be obtained by limiting the P (phosphur) content of the prescribed material to 0.010% or less.

The shot-peening "at a moderate temperature" (hereinafter it is referred to as a "warm shot peening") means shot-peening a spring at a temperature higher than the room temperature. It is a matter of course that the temperature should be lower than the temperature at which the spring is heat-treated (or, more particularly, the tempering temperature) to prevent the hardness of the heat-treated spring from lowering. According to experiments by the present inventors, the most preferable corrosion-fatigue strength is obtained by setting the shot-peening temperature at 100–300° C. The temperature range is more preferably 200–250° C.

It is recommended to use shot particles having hardness of 450–600 Hv in the warm shot peening in order to obtain such a value of residual stress for the spring of such hardness. The hardness of the shot particle is further preferred to be 500–550 Hv.

DETAILED DESCRIPTION OF PREFERRED EMBODIMENTS

Figure 1:
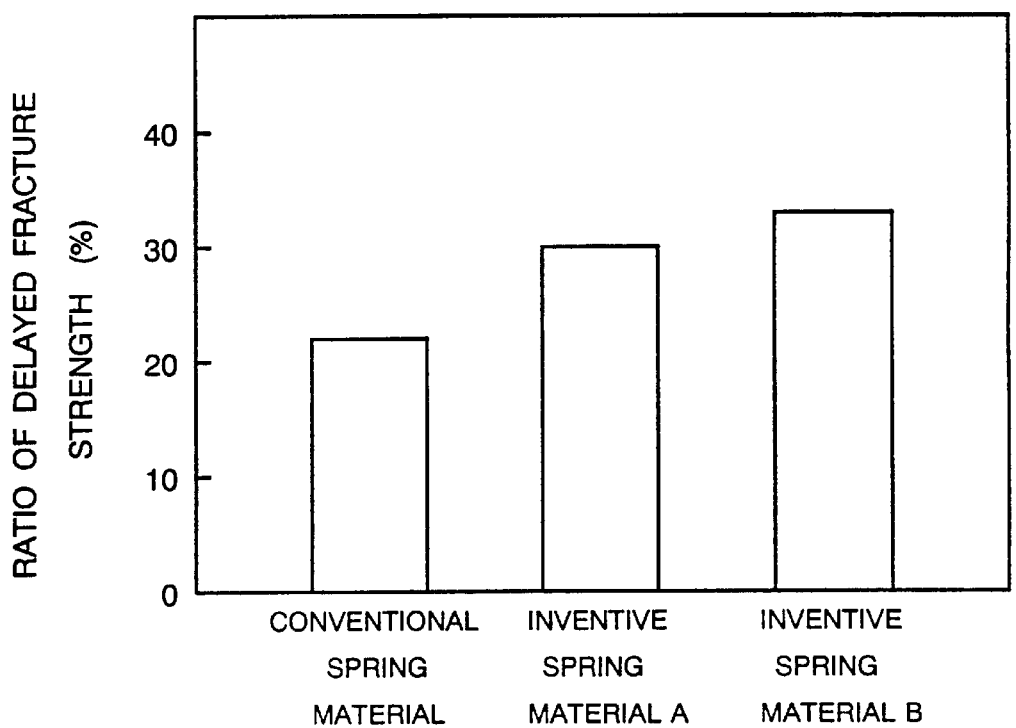
FIG. 1 is a graph showing the result of delayed fracture tests.

Fracture by corrosion fatigue is supposed to occur mainly due to (1) "delayed fracture phenomenon" of the steel, (2) formation of surface pits by corrosion, and (3) reduction in the residual stress after long time use.

The "delayed fracture phenomenon" specifically occurs to high-strength steels. When stress is applied to a steel member, hydrogen enters the steel from the water attached on its surface or from water vapor in the ambient atmosphere. The hydrogen gathers at irregularities in the steel such as inter-crystalline boundaries and steel-inclusion boundaries, and builds up a pressure therein. As the pressure increases, a microscopic crack is generated, which leads to a final fracture of the member. The materials used in many springs these days have higher hardness, and the springs are applied higher stress than before when in use. Also the springs are more frequently used under circumstances where water or the like is attached to its surface as described above. Thus it is important to adequately count the delayed fracture in designing springs with an improved corrosion-fatigue strength.

A surface corrosion pit makes a center of a stress concentration and greatly reduces the fatigue resistance. One of its countermeasures is to prevent the forming of the pits or, if formed, to make the form of the pits to invite a smaller stress concentration. Another countermeasure is to make the material of the spring insusceptible to crack formation.

Residual stress is given to a spring by a shot-peening operation. In detail, the surface of a spring is plastically deformed by a shot-peening operation, and there arises a discrepancy in the degree of deformation between the plastically deformed surface and the undeformed underlayer. The discrepancy produces strain which renders the compressive residual stress in the spring surface. When, therefore, the surface of a spring is removed or when a minute crack generates in the surface, the strain and the stress decrease.

Currently, many springs are made of JIS-SUP7 ("JIS" stands for the Japanese Industrial Standards) steel or JIS-SUP7 steel+Nb and V. For the spring of the present invention, we adopted as the material a steel almost the same as that described in the prescribed Publication of Unexamined Japanese Patent Application No. H3-2354. The reason for the upper and lower limits of the respective elements included in the material steel of the present invention is as follows. Table 1 compares the compositions of the material steel of the present invention and those of JIS-SUP7 steel.

TABLE 1

| | CHEMICAL COMPOSITIONS (wt. %) | | | | | | | |
|---|---|---|---|---|---|---|---|---|
| | C | Si | Mn | S | Ni | Cr | N | V |
| Material of the Invention | 0.35 ~ 0.55 | 1.60 ~ 3.00 | 0.20 ~ 1.50 | 0.010 or Less | 0.40 ~ 3.00 | 0.10 ~ 1.50 | 0.010 ~ 0.025 | 0.05 ~ 0.50 |
| JIS-SUP7 | 0.55 ~ 0.65 | 1.80 ~ 2.20 | 0.70 ~ 1.00 | 0.035 or Less | — | — | — | — |

The range of the Carbon content is set lower than that of the JIS-SUP7 steel (which is hereinafter referred to as the "conventional steel"), because the toughness is improved by lowering the Carbon content while increasing the contents of alloying elements rather than by increasing the Carbon content when the hardness of both materials are the same. The improvement in the toughness lowers the speed of crack generation and crack propagation, and remarkably contributes to improvement in the corrosion-fatigue strength to which the present invention addresses. The lower limit of the Carbon range is set at 0.35% because the above-described hardness is difficult to be obtained after a heat treatment when the Carbon content is lower than that even when the other alloying elements are added to their maximum. The upper limit is set at 0.55% because the toughness of the material deteriorates to a large extent when the carbon content is larger than that.

Since Silicon is known to have a preferable effect in improving the sagging resistance, the upper limit of the Silicon range is set higher in the present invention than that of the conventional steel. Silicon, on the other hand, promotes the surface decarburization. When the Silicon content exceeds 3.00%, the surface decarburization in a heat treatment cannot be ignored, in which case the above-described hardness and residual stress are difficult to be obtained on the surface. Thus the upper limit is set as that.

Manganese is effective in improving the hardenability. Thorough hardening and tempering to the core of a spring is critical in fully materializing the toughness-improving effect of some alloying elements including Nickel (which is described below). When the Manganese content is less than 0.2%, a spring of a large diameter cannot be fully hardened to the core, which is why the lower limit of Manganese is set at 0.2%. The upper limit is set at 1.5%, on the other hand, because the hardness-improving effect saturates around there and the toughness is aggravated.

Sulfur combines with Manganese in steel to form MnS which is insoluble in steel. Since MnS inclusions are plastically deformable to a large degree, they elongate while a steel piece is rolled. The elongated MnS inclusions are apt to become origins of fracture by shock or in fatigue. In the present invention, the upper limit of the Sulfur content is set at 0.010% to preserve the toughness and fatigue resistance when the hardness of the spring is raised.

Nickel is effective in improving toughness of a steel, and it is also effective in suppressing corrosion of a steel. Corrosion-suppression enhances the corrosion-fatigue strength in that it prevents generation of corrosion pits and in that it prevents decrease in the residual stress, as explained above. Such effects of Nickel cannot be obtained with less than 0.4% content. The toughness-improving effect saturates, on the other hand, when the Nickel content exceeds 3%. Since Nickel stabilizes austenite phase in a steel, excessive Nickel content may conserve austenite and make incomplete transformation to martensite in a steel after quenching. Further, Nickel is expensive and boosts the cost of springs. Thus, the upper limit is set at 3%.

Chromium is effective, as Magnanese, in improving hardenability. Chromium is also effective in suppressing surface decarburization. The lower limit of Chromium is set at 0.1% since less than 0.1% Chromium is not adequate to have such effects. Such effects saturate when Chromium content exceeds 1.5%, and excessive Chromium has a drawback in making the tempered structure heterogeneous. That is why the upper limit is set at 1.5%.

Nitrogen combines with Aluminum in steel to form AlN, which precipitates into fine particles in steel. The fine particles impede steel crystals from growing so that Nitrogen is greatly effective in refining the crystals in steel. Such crystal refining effect can be obtained with 0.01% or more of Nitrogen. When the Nitrogen content is excessive in steel, the Nitrogen atoms form N2 gas while the steel is manufactured (specifically, while solidifying and cooling) and deteriorates the steel quality. That is why the upper limit is set at 0.025%.

Vanadium combines with Carbon to form VC (Vanadium Carbide), which precipitate in fine particles in steel. Like AlN described above, fine particles of VC refine the crystals and enhance the toughness of the steel. Also, the large number of fine particles omnipresent in a steel disperse Hydrogen atoms coming into the steel and prevent them from gathering, which suppresses initiation of a delayed fracture explained above. Such effect can be obtained with Vanadium of no less than 0.5%. When Vanadium is added more than 0.5%, the number of the precipitation sites of VC does not increase but each VC particle grows, which means that such effect saturates there. That is why the upper limit is set at 0.5%.

Phosphur deteriorates the toughness of steel. By limiting the Phosphur content to 0.010% or less, it is expected to improve the toughness of the material, and further to improve the corrosion-fatigue strength of the inventive spring. Improvement in toughness is especially important in the present invention because the spring of the present invention is used at higher hardness than conventional ones.

The hardness of the spring after a heat treatment according to the present invention is set at 50.5–55.0 HRC which is higher than the typical hardness range 49–52 HRC of conventional springs. This is to improve the fatigue strength while suppressing sagging when the employing stress (design stress) is raised. Though the hardness is so raised, the toughness of the material is improved by the addition of above described alloying elements and there is no decrease in the fatigue strength.

The residual stress at 0.2 mm depth is set at −600 MPa or more in the present invention. This can be achieved by warm shot peening a spring having the hardness described above with an appropriate shot-peening condition. By thus setting the residual stress not at the very surface but at 0.2 mm depth below surface, the decrease in the residual stress at the surface is effectively prevented and the deterioration in the corrosion-fatigue strength is minimized when the surface is corroded.

The characteristics of the material of the present invention are tested with reference to a conventional spring steel SUP7 with respect to the corrosion resistance, delayed fracture resistance and toughness. The chemical compositions of the tested materials are listed in Table 2. In Table 2, the material A of the present invention has low vanadium content in the range specified above. The material C has low Carbon and Sulphur contents in the specified range. The material D has low Phosphur content in the specified range. Considering actual conditions of use, the tempering temperature of the tested materials is adjusted appropriately so that the hardness of the inventive material should become 53.5 HRC and that of SUP7 should become 51 HRC.

Notched test pieces of the material are electrically charged with hydrogen, and are left subdued under various values of load to yield stress values between 50–120 kgf/mm2. The maximum stress at which no delayed fracture occurs after 100 hour loading for each material is defined as σ100. The ratio RH of σ100 in the case of hydrogen charging (σ100H) to the σ100 in the case of non-hydrogen charging (σ100N), i.e., $$RH = \sigma 100H / \sigma 100N$$

is used to evaluate the delayed fracture characteristic.

The result is shown in FIG. 1, in which even the material of the present invention having Vandadium content close to the lower limit of the specified range (material A) has a higher ratio than the conventional steel SUP7 by more than 30%.

Figure 2:
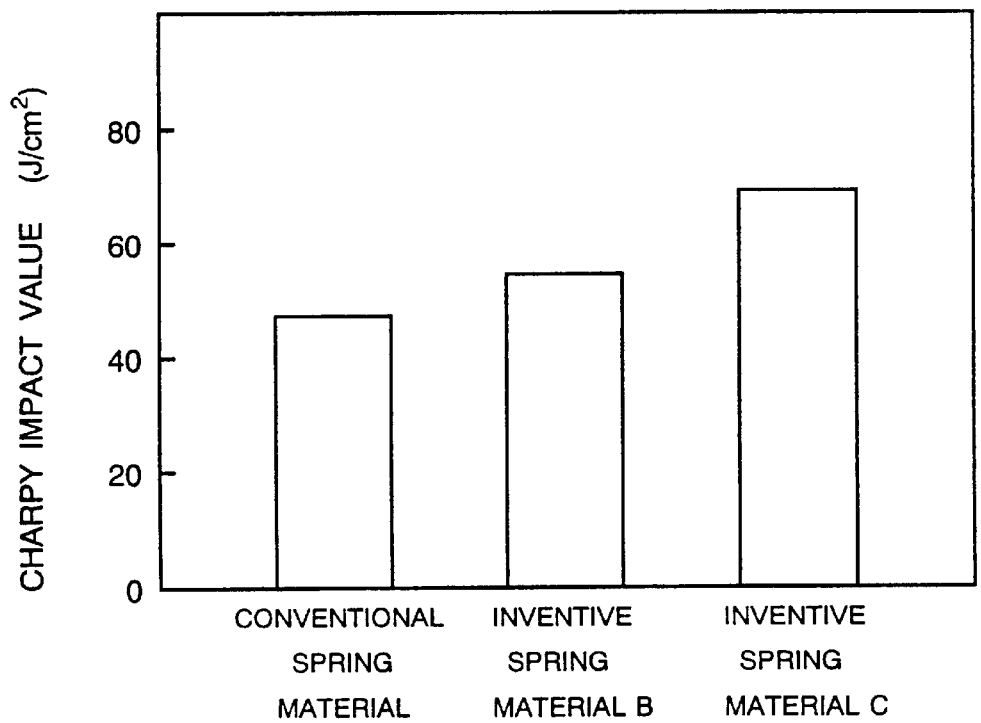
FIG. 2 is a graph showing the result of Charpy impact tests.

A Charpy impact test was conducted for the materials, the result of which is shown in FIG. 2. Even the material of the present invention having Carbon and Sulphur content close to the upper limits of the specified range (material B) has a higher toughness then the conventional steel SUP7 by about 15%.

Various tests were conducted on springs made by the process shown in Table 3 and having dimensions shown in Table 4, the results of which are as follows.

TABLE 3

2tVIM Melting → Blooming (130S) → Billeting → Cutting → Forming → Quenching → Tempering → Setting → Warm Shot Peening → Tempering → Setting

TABLE 2

CHEMICAL COMPOSITIONS OF THE TESTED MATERIALS (wt. %)

|  | C | Si | Mn | P | S | Ni | Cr | N | V |
|---|---|---|---|---|---|---|---|---|---|
| Inventive Material A | 0.55 | 1.95 | 0.99 | 0.013 | 0.010 | 0.50 | 0.20 | 0.0116 | 0.09 |
| Inventive Material B | 0.53 | 2.00 | 0.70 | 0.015 | 0.010 | 0.55 | 0.20 | 0.0140 | 0.20 |
| Inventive Material C | 0.47 | 1.98 | 0.71 | 0.014 | 0.005 | 0.55 | 0.20 | 0.0120 | 0.20 |
| Inventive Material D | 0.53 | 2.01 | 0.98 | 0.006 | 0.006 | 0.49 | 0.20 | 0.0110 | 0.10 |
| Conventional Material (SUP 7) | 0.60 | 1.97 | 0.90 | 0.014 | 0.019 | — | — | — | — |

TABLE 4

| Spring Type | Wire Diameter (mm) | Coil Diameter (mm) | Free Length (mm) | Effective Number of Turn (Turn) | Spring Constant (N/mm) |
|---|---|---|---|---|---|
| Open-ended Helical | φ11 | φ100 | 311 | 5.29 | 27.2 |

The "Forming" in Table 3 includes a hot forming and a cold forming.

The maximum depth of corrosion on springs after undergoing various number of corrosion cycles is measured. A corrosion cycle is composed of:

spraying salt water for 3 hours+drying for 21 hours.

Figure 3:
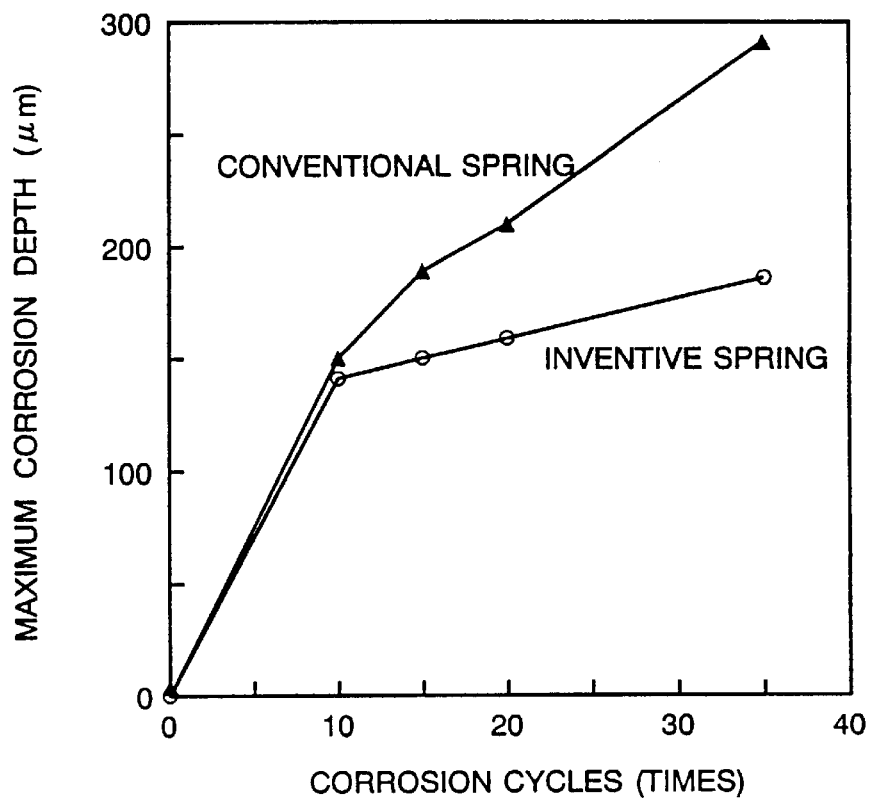
FIG. 3 is a graph showing the result of corrosion tests.

The corrosion cycle is repeated 35 times at most, and the maximum depth is measured at appropriate intervals, the result of which is shown in FIG. 3. It is shown that corrosion speed is apparently slower in case of springs of the present invention than conventional springs after 10 corrosion cycles or more. When the springs are used as suspension springs of an automobile, for example, the springs of the present invention can prevent lowering of the fatigue strength after long time use.

Figure 4:
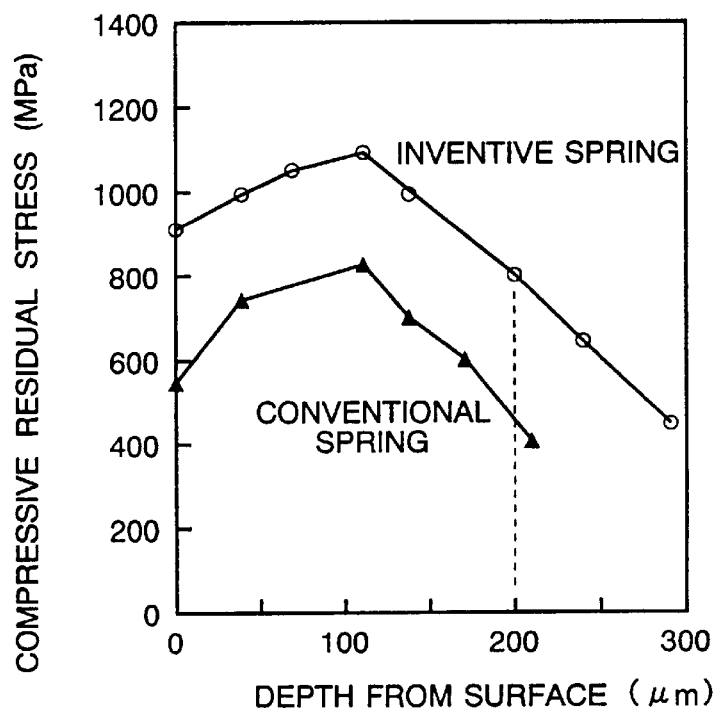
FIG. 4 is a graph of residual stress in relation to the depth from surface.

The residual stress distribution under the surface is measured by the X-ray method after springs are tempered, warm shot peened at 250° C. and cooled to room temperature. We used shot particles having a hardness of 520 Hv. As shown in FIG. 4, the spring of the present invention has generally higher residual stress than a conventional one. Specifically at 0.2 mm (200 μm) depth from surface, the spring of the present invention still retains high residual stress of 800 MPa while that of the conventional spring drops to about 430 MPa. This lowers the decrease in the residual stress due to surface corrosion to a larger extent than in the case of conventional springs.

Figure 5:
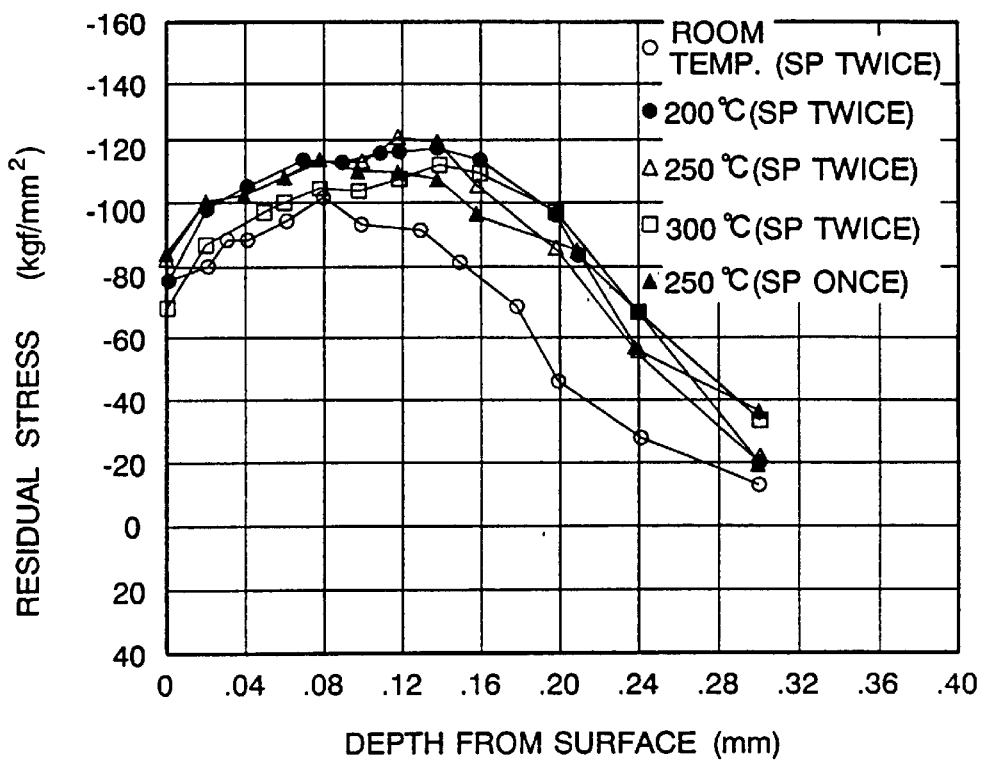
FIG. 5 is a graph of residual stress in relation to the temperature of warm shot peening.

In order to reveal the effect of warm shot peening, the relationship between the shot peening temperature and the residual stress distribution is shown by setting the temperature at the room temperature and various temperatures between 200–300° C. The result is shown in FIG. 5, in which the compressive residual stress at the very surface and the value of the maximum compressive residual stress increase by the warm shot peening. It is further apparent that especially the residual stress at just below the surface increases, which is thought to contribute to the improvement of the fatigue strength after corrosion.

Figure 6:
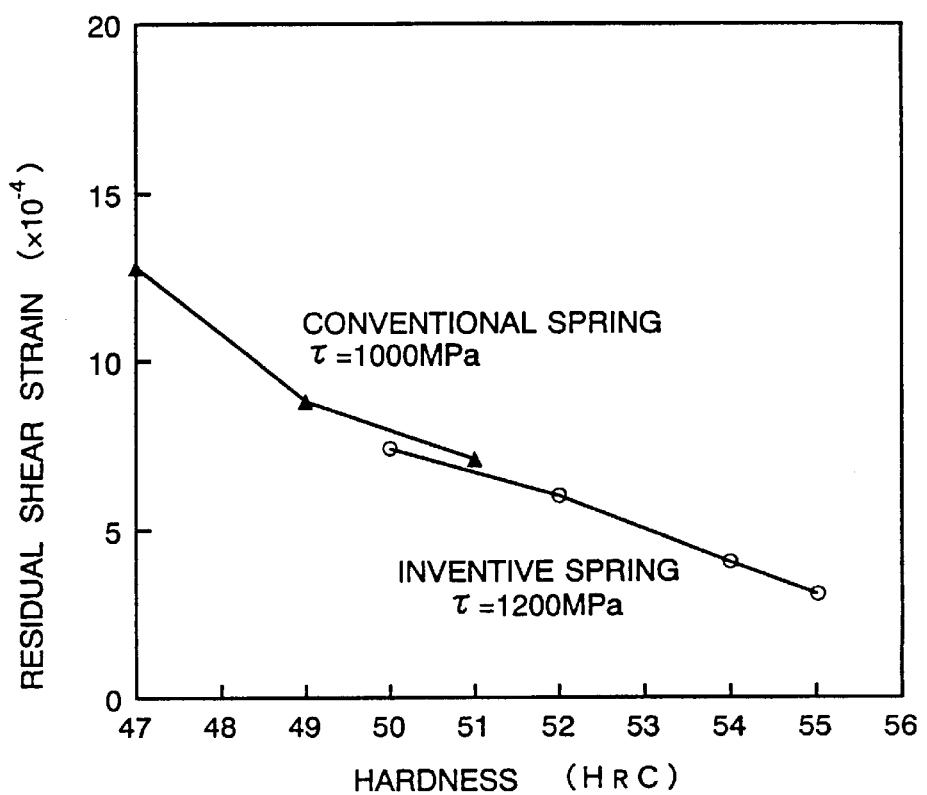
FIG. 6 is a graph showing the result of sagging tests.

The test was performed with various hardness of springs which were obtained through varying the tempering temperatures. Considering that the springs of the present invention are used at higher employing stress (design stress), the load stress is set at τ=1000 MPa for conventional springs. The test condition is determined at 80° C.×96 hours to accelerate the sagging. The result is shown in FIG. 6, in which the amount of sagging (or residual shear strain) of the springs of the present invention is about half, though the load stress is higher, as that of conventional springs.

Figure 7:
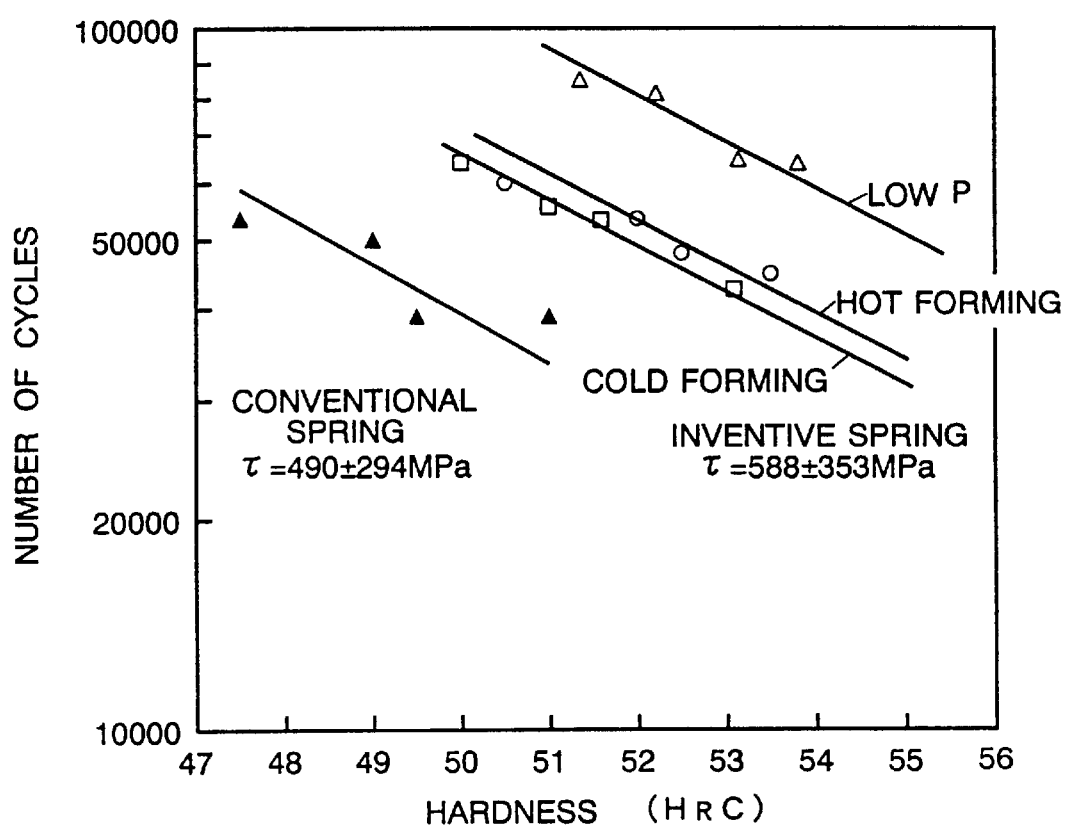
FIG. 7 is a graph showing the result of corrosion fatigue tests.

A corrosion fatigue test was performed for springs of various hardness without surface coating. Here again the actual employing condition is considered so that the test stress of conventional springs is set as low as τ=490±294 MPa while that of inventive springs is set as high as τ=588±353 MPa. The result is shown in FIG. 7, in which the inventive springs have almost the same corrosion fatigue life as that of conventional springs although the applied stress, in both the mean stress and the stress amplification, is higher. Especially the invention spring using the material D with lower Phosphur content has a high fatigue strength. It is also shown in FIG. 7 that corrosion-fatigue strength of the inventive spring is good irrespective of the forming method, i.e., cold forming or hot forming. While warm shot peening aims at improving the corrosion fatigue resistance, a secondary shot peening is performed at room temperature when the durability of the spring is required. The secondary shot peening at room temperature decreases the surface roughness of a spring which enhances durability.

In the present invention, as explained above, alloying elements are designed to endow the material with adequate strength, toughness and corrosion resistance, and the hardness after heat treatment, warm shot peening and the resultant residual stress value are appropriately specified. By those measures, the spring of the present invention have the same or higher sagging resistance and higher corrosion-fatigue strength even when they are employed with higher stress than conventional springs, which allows raising the design stress of the springs and reducing the weight of springs maintaining the same level of performance.

What is claimed is:

1. A spring formed of a steel material comprising by weight: C: 0.35–0.55%, Si: 1.60–3.00%, Mn: 0.20–1.50%, S: 0.010% or less, Ni: 0.40–3.00%, Cr: 0.10–1.50%, N: 0.10–0.025%, V: 0.05–0.50% and the balance Fe, wherein the spring is heat treated to have a hardness of 50.5–55.0 HRC, and is shot-peened at a temperature of 100–300° C. to render a residual stress of −600 MPa or more at a depth of 0.2 mm below a surface of the spring.

2. The spring according to claim 1, wherein the material further comprises P: 0.010% or less.

3. The spring according to claim 1, wherein the spring is formed at an elevated temperature.

4. The spring according to claim 2, wherein the spring is formed at an elevated temperature.

5. The spring according to claim 1, wherein the spring is formed at a normal temperature.

6. The spring according to claim 2, wherein the spring is formed at a normal temperature.

7. The spring according to claim 1, wherein the moderate temperature at which the spring is shot-peened is 200–250° C.

8. The spring according to claim 2, wherein the moderate temperature at which the spring is shot-peened is 200–250° C.

9. The spring according to claim 1, wherein the spring is shot-peened with shot particles having a hardness of 450–600 Hv.

10. The spring according to claim 9, wherein the spring is shot-peened with shot particles having a hardness of 500–550 Hv.

11. The spring according to claim 2, wherein the spring is shot-peened with shot particles having a hardness of 450–600 Hv.

12. The spring according to claim 11, wherein the spring is shot-peened with shot particles having a hardness of 500–550 Hv.

13. The spring according to claim 3, wherein the spring is shot-peened with shot articles having a hardness of 450–600 Hv.

14. The spring according to claim 5, wherein the spring is shot-peened with shot particles having a hardness of 450–600 Hv.

15. A spring formed of a steel material consisting essentially of by weight: C: 0.35–0.55%, Si: 1.60–3.00%, Mn:

0.20–1.50%, S: 0.010% or less, Ni: 0.40–3.00%, Cr: 0.10–1.50%, N: 0.10–0.025%, V: 0.05–0.50% and the balance Fe, wherein the spring is heat treated to have a hardness of 50.5–55.0 HRC, and is shot-peened at a temperature of 100–300° C. to render a residual stress of –600 MPa or more at a depth of 0.2 mm below a surface of the spring.

16. A spring formed of a steel material consisting essentially of by weight: C: 0.35–0.55%, Si: 1.60–3.00%, Mn: 0.20–1.50%, S: 0.010% or less, Ni: 0.40–3.00%, Cr: 0.10–1.50%, N: 0.10–0.025%, V: 0.05–0.50%, P: 0.010% or less and the balance Fe, wherein the spring is heat treated to have a hardness of 50.5–55.0 HRC, and is shot-peened at a temperature of 100–300° C. to render a residual stress of –600 MPa or more at a depth of 0.2 mm below a surface of the spring.

17. The spring according to claim 1, wherein the steel material has a nickel content of 0.49–0.55%.

18. The spring according to claim 15, wherein the steel material has a nickel content of 0.49–0.55.

19. The spring according to claim 16, wherein the steel material has a nickel content of 0.49–0.55.

20. The spring according to claim 1, characterized as having a charpy notch toughness value of at least 50 J/cm$^2$.

* * * * *

UNITED STATES PATENT AND TRADEMARK OFFICE
CERTIFICATE OF CORRECTION

PATENT NO. : 6,193,816 B1
DATED : February 27, 2001
INVENTOR(S) : Tomohiro Nakano, Takayuki Sakakibara and Masami Wakita It is certified that error appears in the above-identified patent and that said Letters Patent is hereby corrected as shown below:

Claim 1,
Line 4, change "N:0.10-0.025%" to -- N:0.010-0.025% --.

Claim 15,
Line 4, change "N:0.10-0.025%" to -- N:0.010-0.025% --.

Claim 16,
Line 4, change "N:0.10-0.025%" to -- N:0.010-0.025% --.

Signed and Sealed this

Ninth Day of October, 2001

Attest:

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 6,193,816 B1　　　　　　　　　　　　　　　　　　　　　Page 1 of 1
DATED : February 27, 2001
INVENTOR(S) : Tomohiro Nakano, Takayuki Sakakibara and Masami Wakita It is certified that error appears in the above-identified patent and that said Letters Patent is hereby corrected as shown below:

<u>Title page,</u>
Item [54], change the title from "SPRING WITH CORROSION FATIGUE STRENGTH" to -- SPRING WITH CORROSION RESISTANCE AND FATIGUE STRENGTH --.

Signed and Sealed this

Fifth Day of February, 2002

Attest:

JAMES E. ROGAN
*Director of the United States Patent and Trademark Office*

*Attesting Officer*